Oct. 17, 1967  R. G. V. McKEOWN  3,347,618
STERILIZER
Filed April 6, 1964
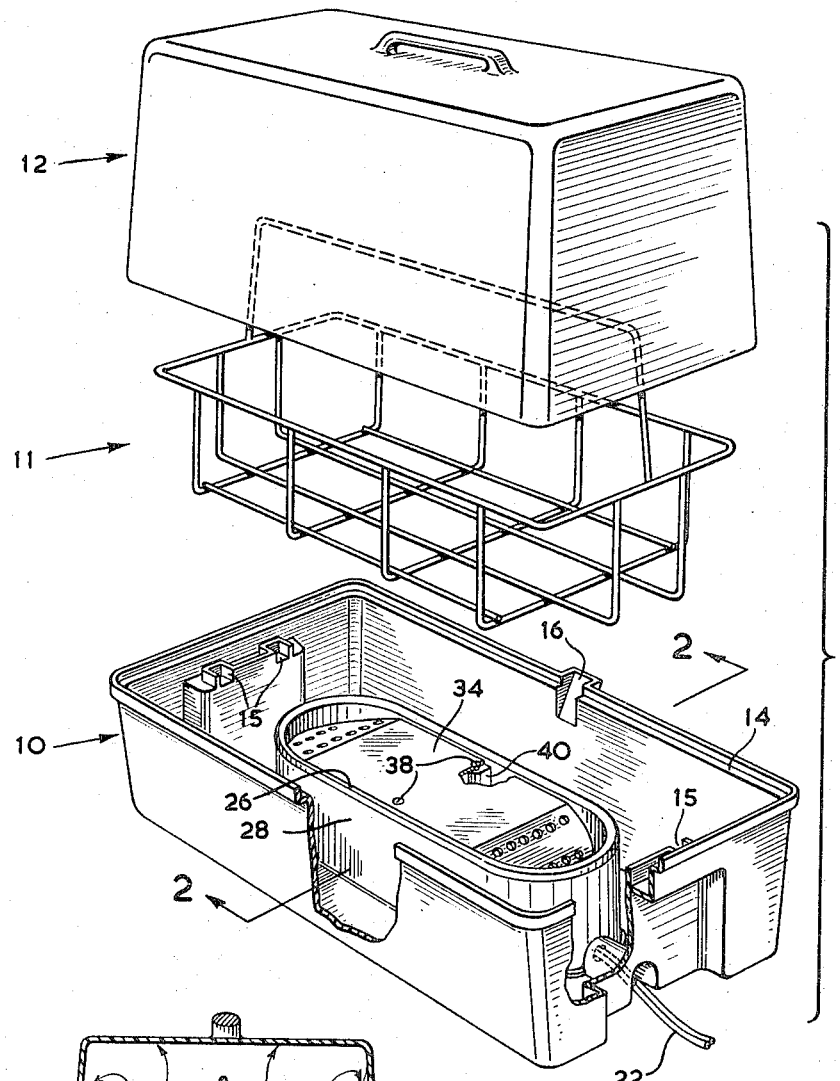
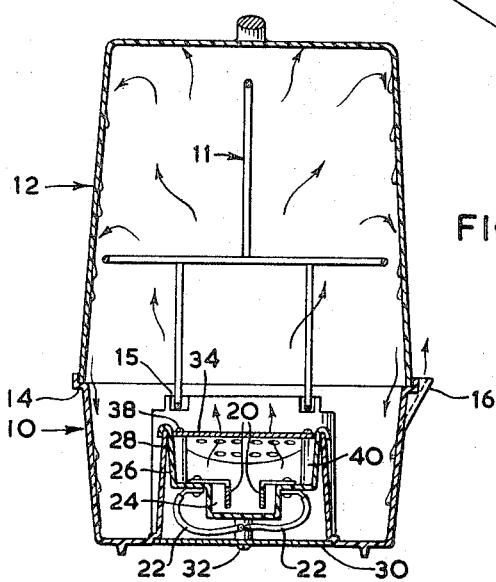
INVENTOR.
ROBERT McKEOWN
BY~ Fetherstonhaugh & Co.
ATTORNEYS

United States Patent Office 3,347,618
Patented Oct. 17, 1967

3,347,618
STERILIZER
Robert G. V. McKeown, Toronto, Ontario, Canada, assignor to Hankscraft (Canada) Ltd., Toronto, Ontario, Canada
Filed Apr. 6, 1964, Ser. No. 357,395
3 Claims. (Cl. 21—94)

This invention relates to the manufacture of steam-type sterilizers, and is particularly concerned with sterilizers employing liquid conductor heating devices.

Steam-type sterilizers essentially consist of closed boxes and means for producing steam within the boxes whereby the heat of the steam may be utilized to sterilize articles held within the boxes. They have a multitude of uses, one of the most common of which is the sterilization of infants' feeding formula. In this case, the sterilizer is used to raise the temperature of the formula to the temperature of pasteurization. Similarly constructed devices may also be used for purposes other than sterilization. For example, certain types of egg cookers employ the same heating principle as sterilizers. Here, of course, it is simply the object to raise the temperature of the contained eggs as to cook them. However, the same principle is employed in that the egg cooker essentially consists of a closed box having means for producing steam within the box.

As indicated above, the sterilizer in accord with this invention is of the type which employs a liquid conductor heater for producing the steam. This type of heater is generally well known, and essentially consists of two spaced electrodes connected directly to line current. The electrodes are immersed in water, which acts as a conductor as to close the circuit between the eletrodes, and as the current flows between the electrodes through the water, the latter is heated. The advantage of this type of heater is that it automatically shuts off as the water in which the electrodes are immersed boils away.

The automatic shut-off principle is employed to time the heating operation. By using more or less water in which to immerse the electrodes, the total time of operation of the heater can be varied. For example, in an egg cooker, it is possible to time operation of the device as to cook soft or hard boiled eggs, as is desired.

Unfortunately, however, the above mentioned timing method, while theoretically possible, has proved difficult in practice, due to the fact that condensed steam drains back to the well in which the electrodes are located, and is re-boiled. It has been found almost impossible to predict the amount of this undesired recirculation, with the result that the same quantity of water might cause operation of the device to continue for periods of time varying by considerable amounts at different times. In certain applications, this can have serious consequences. For example, in sterilizing infants' formula, it is preferred to raise the temperature of the formula to approximately 143°, where it is held for 20 to 23 minutes. If, however, due to condensation of the steam and subsequent drainage to the electrode well and reboiling, the temperature of the formula is raised above this temperature and held for a longer period of time, a good proportion of the vitamin B and C content of the formula will be lost, as will the available iodine and assimilable calcium. Experience with sterilizers heretofore available has shown that in some cases, repeated reboiling of the condensate has raised the temperature to 200° F. and the period of time to two hours.

It is, therefore, an object of this invention to provide a liquid conductor steriilzer having means for more closely controlling the length of operation than is possible with the sterilizers heretofore available.

It is a more specific object of the invention to provide a liquid conductor sterilizer having means for preventing condensate returning to the electrode well, as to avoid repeated boiling of this condensate with the resultant difficulty in determining the length of operation of the sterilizer.

The above objects of the invention will be more thoroughly understood from the following description of a preferred embodiment thereof as read in conjunction with the accompanying drawings.

In the drawings,

FIGURE 1 is a perspective view of a sterilizer in accord with this preferred embodiment of the invention, with certain parts of the sterilizer being raised above their normal operative position, and with portions of the device broken away for better illustration.

FIGURE 2 is a cross-sectional view taken along the line 2—2 of FIGURE 1, with the exception that the parts raised above their normal operative position in FIGURE 1 are shown in their normal operative position in FIGURE 2.

Referring to FIGURE 1, the illustrated sterilizer is intended to hold a number of infant feeding bottles and the device is accordingly, primarily intended for the sterilization of infants' formula. However, it is to be understood that the invention is not to be restricted to sterilizers for infants' formula, and that the inventive concept illustrated by reference to this bottle sterilizer may be incorporated in other types of sterilizers or cookers, including egg cookers.

The illustrated device essentially consists of a receptacle-like base member 10, a rack 11 for holding a number of infant feeding bottles, and a cover 12. Each of these members are manufactured of plastic, but other materials such as stainless steel could be employed. Rack 11 is preferably partitioned as to separate the bottles from one another, whereby to permit full flow of steam thereover. In sterilizers or cookers intended for other uses than sterilization of infants' formula, the rack will be appropriately shaped to hold the articles to be cooked or sterilized, as the case may be. Cover 12 rests on a flange 14, extending around the upper edge of base 10. As a safety feature, the upper edge of the base is provided with a steam vent 16, whereby to prevent excessive steam pressure within the device. Rack 11 is held in the position shown in FIGURE 2 by being received in four sockets 15, which are formed integrally on the inside surface of the end walls of base 10.

As can be appreciated from the above, the illustrated sterilizer essentially consists of a receptacle-like base and a cover which define between them a closed space which contains a rack for holding the articles to be sterilizer or cooked.

At the bottom of base 10, there is a liquid conductor heating device. This consists of a pair of spaced electrodes 20 (FIGURE 2), which are connected to line current by the lead wires 22. The electrodes, which actually comprise U-shaped elements, are contained within a well 24, which is formed in the bottom wall of a dish 26 with the dish being held by an upstanding wall 28 which is an integral part of base 10. As can best be seen in FIGURE 2, the top edge of dish 26 fits over the top edge of wall 28. A plate 30 closes the space beneath dish 26 and is held in place by means of one or more screws 32 engaged in one or more lugs formed integrally with and projecting downwardly from the bottom of dish 26. A cover plate 34 is fixed to the top of dish 26 by means of a pair of screws 38 received in integral lugs 40, carried on the inside surface of the walls of the dish 26. Plate 34 is apertured only at the opposed downwardly sloping ends thereof so that steam rising from the well 24 is diverted towards the ends of the sterilizer, whereby to gain more effective circulation of the steam over the articles being heated.

The above described embodiment of this invention primarily differs from sterilizers known heretofore by the provision of the wall 28, which surrounds the heating device contained in the bottom of base 10. With the known sterilizers, the heating devices are received in wells in the bottoms thereof in such a manner that condensate draining downwardly from the walls of the cover and the base passes into the well and is reboiled. Since it is the object in using liquid conductor heaters to provide automatic shut-off for the sterilizers whereby to control the time of operation by varying the quantity of water originally placed in the well, the known sterilizers fail to operate properly, due to his recirculation and re-boiling of condensate.

In the sterilizer in accord with this invention, the wall 28 prevents condensate from reaching the well within which a heating device is received, so that the above mentioned problem is avoided, and it is possible to closely control the length of operation of the device by avoiding the re-circulation and reboiling of condensate.

Additional benefits are derived from the particular construction used in the illustrated embodiment. For example, savings in manufacturing costs are effected by forming wall 28 as an integral part of base member 10 and providing a separate dish member for holding the electrodes. Further, the cover plate 34 achieves a particularly good steam circulation with the result that the device is efficient in terms of power consumed during the heating operation.

What I claim as my invention is:

1. A sterilizer for heating articles by steam, said sterilizer comprising a receptacle-like base member, rack means for holding articles to be heated, means for holding said rack means on said base member, a cover member removably carried on said base member and defining a closed space therewith, said rack means being enclosed within said space, a liquid conductor heating device positioned within said base member at the bottom thereof and an upstanding wall surrounding said heating device as to prevent condensate draining downwardly from the walls of said base member and cover from contacting said heating device.

2. A sterilizer as claimed in claim 1, in which said base is moulded of plastic and in which said upstanding wall is formed as an integral part of said base, said heating device being received in a well in a separate dish member positioned within the confines of said wall.

3. A sterilizer as claimed in claim 2, including a plate member fixed to the top of said dish member, said plate being apertured at spaced apart areas as to divert the steam rising from said well whereby to prevent steam rising from the center of said well, thereby effecting better circulation of said steam over said articles.

References Cited

UNITED STATES PATENTS

| 2,467,337 | 4/1949 | Schnell | 21—91 |
| 2,501,193 | 3/1950 | Schulte | 21—79 |
| 2,837,625 | 6/1958 | Conlin et al. | 219—288 |

OTHER REFERENCES

Catalogue, Bacteriological Apparatus, Wilmot Castle Co., Rochester, N.Y., 1910, pages 25 and 26 relied on.

MORRIS O. WOLK, *Primary Examiner.*

R. M. REESE, *Assistant Examiner.*